(12) United States Patent
Chambers et al.

(10) Patent No.: US 7,565,160 B2
(45) Date of Patent: Jul. 21, 2009

(54) SYSTEM AND METHOD OF HANDLING PRIORITIZED WIRELESS CALLS FOR MOBILE DEVICES OPERATING IN AN ANALOG OR TDMA MODE

(75) Inventors: Michael D. Chambers, Plainfield, IL (US); Bonnie P. Hitzeman, Winfield, IL (US); Rafael Quintero, Bolingbrook, IL (US); Douglass H. Riley, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 792 days.

(21) Appl. No.: 10/703,999

(22) Filed: Nov. 7, 2003

(65) Prior Publication Data

US 2005/0101324 A1    May 12, 2005

(51) Int. Cl.
*H04B 7/00*    (2006.01)
(52) U.S. Cl. ............... 455/512; 455/404.1; 455/521
(58) Field of Classification Search ............ 455/450, 455/451, 452.1, 453, 445, 404.1, 512, 521, 455/527, 435.3
See application file for complete search history.

(56) References Cited

U.S. PATENT DOCUMENTS

| | | | | |
|---|---|---|---|---|
| 6,011,978 | A * | 1/2000 | Ault et al. | 455/552.1 |
| 6,154,644 | A * | 11/2000 | Murray | 455/414.1 |
| 6,597,920 | B2 * | 7/2003 | Yegani et al. | 455/512 |
| 2001/0018348 | A1 * | 8/2001 | Joshi et al. | 455/450 |
| 2004/0029592 | A1 * | 2/2004 | Shyy et al. | 455/453 |
| 2004/0203573 | A1 * | 10/2004 | Chin et al. | 455/404.1 |

OTHER PUBLICATIONS

Performance modeling of high probability call-completion features McGregor, P.V.; Szeto, J.; Suraci, F.; Computer Communications and Networks, 1998. Proceedings. 7th International Conference on Oct. 12-15, 1998 pp. 81-90.*

* cited by examiner

*Primary Examiner*—Raymond S Dean (57) ABSTRACT

An improved method and system are disclosed for processing prioritized wireless calls. One embodiment of the present invention includes a method of providing prioritized wireless services, comprising the steps of: receiving a request for prioritized wireless service from a mobile device; determining the availability of a radio channel without obtaining the priority of the request; and if no radio channel is available, assigning a priority to the request and queuing the request according to the assigned priority.

7 Claims, 9 Drawing Sheets

SYSTEM AND METHOD OF HANDLING PRIORITIZED WIRELESS CALLS FOR MOBILE DEVICES OPERATING IN AN ANALOG OR TDMA MODE

FIELD OF THE INVENTION

This invention relates in general to wireless telecommunications and specifically to an improved method and system for processing prioritized wireless calls.

BACKGROUND OF THE INVENTION

Cellular telephones often provide the primary means of communication in emergency situations. Increased cellular phone usage by the general public, however, often results in network congestion, particularly during emergency situations. Such congestion could prevent key personnel from obtaining access to the network during an emergency, thereby delaying their responses to and resolution of the emergency.

One way to ensure access to wireless services during an emergency is to provide prioritized wireless services for key personnel. In prioritized wireless services, every user is assigned a priority level based on the importance of his or her role in resolving the emergency. Service requests from the users are queued and service is provided according to each user's priority.

An example of prioritized wireless services is the Wireless Priority Service (WPS) program developed by the Department of Homeland Security. The WPS is a White House-directed National Security/Emergency Preparedness (NS/EP) National Communications System (NCS) program dedicated to providing prioritized cellular network access for key national security and emergency response personnel. The goal of WPS is to provide an end-to-end nationwide wireless priority communications capability to key NS/EP personnel during natural or man-made disasters or emergencies that cause congestion or network outages in the Public Switched Telephone Network (PSTN).

Essentially, WPS is an enhancement to basic cellular service that allows prioritized NS/EP calls to queue for the next available service channel. The U.S. government specification for the WPS final capability defines 5 levels of priorities (priority 1-5, with priority 1 the highest priority) based on the WPS user's importance to national security. To request WPS services, a user needs to dial *272 and then the destination number. The user's call is then sent to its nearby base station (BS) and mobile switching center (MSC) and is queued for an available radio channel according to the user's priority. A complete description of WPS can be found in "Wireless Priority Service (WPS) Industry Requirements for the Full Operating Capability (FOC) for CDMA-based Systems," Issue 1.0, March 2003, the contents of which are hereby incorporated in its entirety as reference.

A drawback of the above WPS is that it only supports Code Division Multiple Access (CDMA)-based wireless networks. As a result, users of mobile devices based on other multiple access protocols, such as Time Division Multiple Access (TDMA), or mobile devices operating in an analog mode will not have access to WPS services due to the technological differences behind these protocols and their air interfaces. Although CDMA-based networks are gaining popularity, the number of analog/TDMA users is still significant. In order to provide complete WSP services to all users, there is therefore a need to develop methods and systems that extend WPS services to mobile devices and wireless networks that do not operate according to CDMA-based protocols.

Furthermore, a WPS request may be queued for too long before being processed. As a result, the mobile sending the WPS request may drop the call before being assigned a radio channel. There is therefore another need to provide a method and system that could reduce the "queuing time" of WPS requests.

SUMMARY OF INVENTION

The present invention overcomes the limitations of prior art and extends prioritized wireless services to mobile devices and wireless networks that do not operate according to CDMA-based protocols. One aspect of the present invention includes a method for providing improved prioritized wireless services. In one embodiment of the method, a request for prioritized wireless service is first received from a mobile device. The mobile device may be any mobile device that operates according to any existing protocols. The method then determines the availability of a radio channel without obtaining the priority of the request. If a radio channel is available, then it is assigned to the mobile device. If no radio channel is available, the request is assigned a priority and is queued for a radio channel according to the assigned priority.

In an alternative embodiment, the mobile device may be a non-CDMA mobile device, such as a TDMA or analog mobile device, that includes a timer for timing the processing of the request. The mobile device may drop the call, if it is not assigned a radio channel before the timer expires. In this case, a callback message may be sent to the mobile device to re-assign the radio channel.

In another embodiment of the method, a prioritized message requesting connection to a mobile device is first received. The mobile device may further comprises a timer. The method then determines the availability of a radio channel to the mobile device based on the priority of the request, and informs the mobile device of the availability of the radio channel. If the timer expires, a callback message may be sent to the mobile device to re-assign the radio channel.

Other aspects of the present invention include a mobile switching center (MSC) adapted to execute the above methods, and a system comprising one or more mobile switching centers (MSC's) adapted to execute the above methods.

DETAILED DESCRIPTION OF PREFERRED EMBODIMENTS

Figure 1:
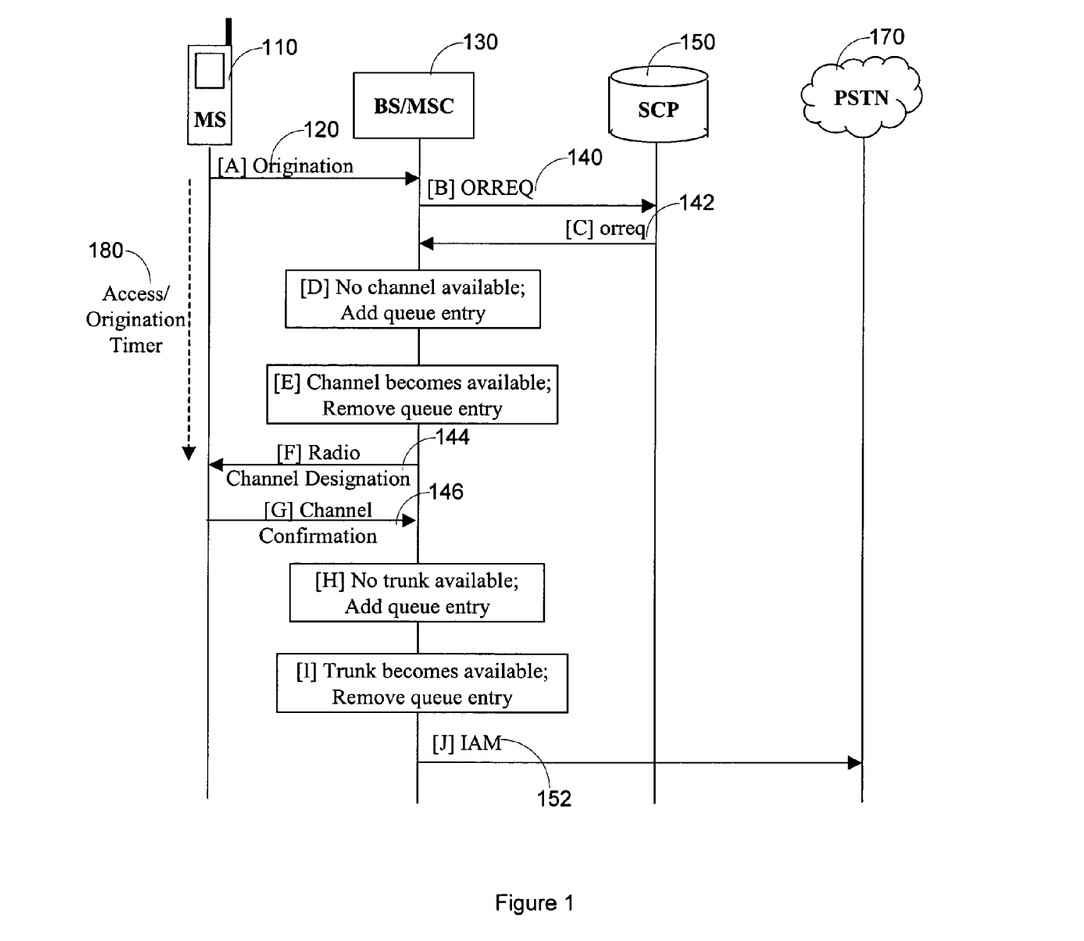
FIG. 1 schematically depicts the communications between a base station/mobile switching center (BS/MSC) and other wireless network elements in one embodiment of the present invention.

FIG. 1 illustrates the communications between a mobile switching center (MSC) 130 and other wireless network elements in one embodiment of the present invention. The MSC 130 can include a single base station (BS) located in the cell of MS 110, or it can include a group of inter-connected base stations. Messages communicated between MSC 130 and MS 110 may be first received by a base station and then forwarded to the MSC 130. In this embodiment, a mobile device (MS) 110 first sends an Origination message 120 to the MSC 130 requesting prioritized wireless services. In one embodiment, the mobile device is an analog or TDMA cellular phone. In another embodiment, the mobile device is a multi-mode cellular phone operating in an analog or TDMA mode. A mobile device typically has a timer (the Access Timer for an analog MS or the Origination Timer for a TDMA MS) for timing the call connection time and for aborting the call if no radio channel becomes available before the timer expires. The timer's value is typically approximately 5 seconds for an analog MS and approximately 9.6-12.8 seconds for an TDMA MS. In one embodiment, the timer 180 in the MS 110 is started after the Origination message 120 is sent. The Origination message 120 may include a special label code for prioritized wireless services and a destination number. In one embodiment, the special label code is the "*272" code. The Origination message can be formatted according to any available analog or TDMA-based wireless communication protocol standard. An example of an analog-based protocol standard is the EIA/TIA-553 standard, the contents of which are hereby incorporated in its entirety by reference. An example of a TDMA-based protocol standard is the EIA/TIA-136 standard, the contents of which are also hereby incorporated in its entirety by reference.

The Origination message 120 in FIG. 1 is received by an MSC 130. The MSC 130 is preferably connected to the cell serving MS 110. The MSC 130 determines whether the Origination message 120 is a prioritized service request by, for example, checking for a special label code. After determining that the Origination message 120 is indeed a prioritized service request, the MSC 130 sends a query message 140 to a service control point (SCP) 150. In one embodiment, the query message 140 includes the identity of the user of the MS 110, the special label code, and/or the destination number.

In one embodiment, the service control point (SCP) 150 first determines, based on the special code, that the query is related to a priority service invocation. The SCP 150 then validates the request and determines its priority based on the MS 110 user's identity. The SCP 150 may include a database holding the priority associated with each user. In one embodiment, the SCP 150 determines the priority of the user and sends a response 142 to the MSC 130. The response 142 includes the priority of the user and an indicator showing whether the prioritized service validation is successful.

After receiving the response message 142, the MSC 130 uses the indicator to determine if the validation was successful. If it was, the MSC 130 then determines whether a radio channel is available for assignment to the MS 110. If no radio channel is available, the MSC 130 puts the request from the MS 110 in a queue for an available radio channel according to its entry time and its priority. Because the MSC 130 may receive both prioritized service requests and other "regular" service requests, the queue for radio channel may contain only prioritized service requests, or it may contain a mixture of prioritized service requests and other "regular" requests with the regular requests having the lowest priority. The MSC 130 may also maintain both a prioritized service-only queue and a "public" queue for regular requests. In that case, the MSC 130 may also employ an algorithm to adjust the assignment of radio channels to either queue.

If a radio channel becomes available, the MSC 130 removes the request from the queue and sends a channel designation message 144 to the MS 110. If the timer 180 expires before message 144 reaches the MS 110, the MS 110 will drop the call and will not respond to message 144. If, however, the timer 180 has not expired, the MS 110 responds with a message 146 confirming the assignment of the radio channel.

Figure 2A:
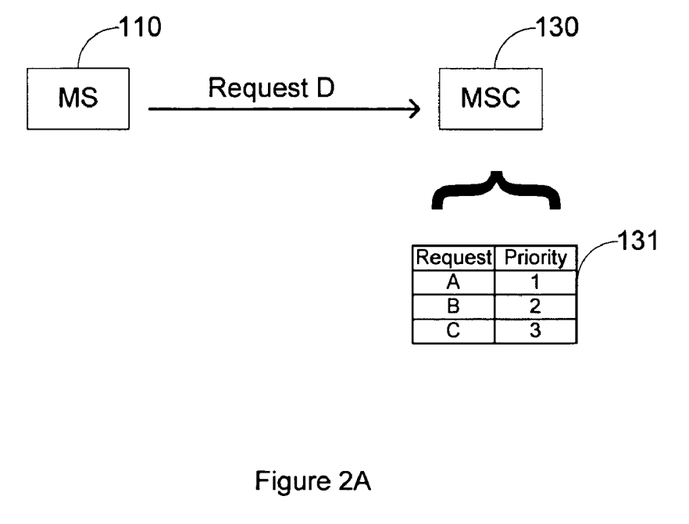
FIGS. 2A-2B illustrates the interactions between a mobile device, a BS/MSC, and a service control point (SCP) in one embodiment of the present invention.
Figure 2B:
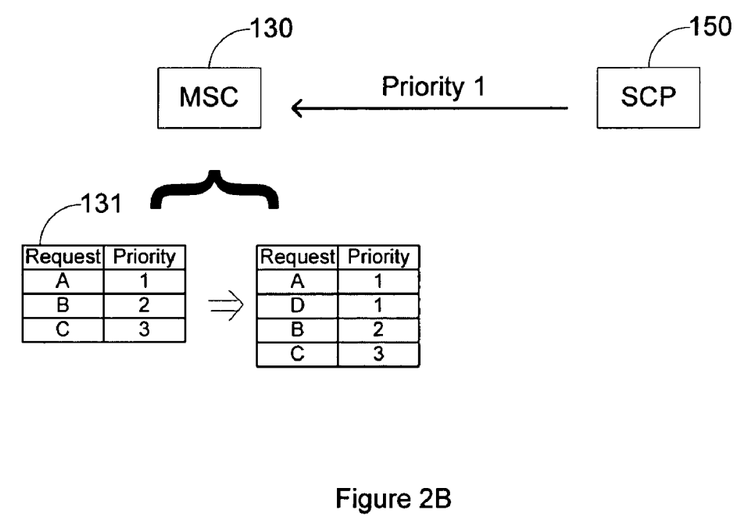

An example of the interactions between the MS 110, the MSC 130 and the SCP 150 is illustrated using the example illustrated in FIG. 2. As shown in FIG. 2A, if the MSC 130 receives a request for prioritized services (request D) from the MS 110 and there are three requests (requests A, B and C with priority 1, 2 and 3, respectively) pending in the MSC 130's queue 131, then the MSC 130 detects that request D is a prioritized service request and queries the SCP 150 for validation and priority. As shown in FIG. 2B, the SCP 150 validates the request and returns its priority. The MSC 130 then inserts request D in its queue 131 according to its priority and entry time. If request D has a priority of 1 for example, then it is inserted right below request A since it has a higher priority than requests B and C, but its entry time is later than request A. This means that request D will be the next one to be assigned a radio channel after request A is assigned.

Note that a CDMA-based MSC conforming to the Telecommunications Systems Bulletin 74 (TSB74) standard can use the Status Request message defined in EIA/TIA-95 to reset the timer in a mobile device operating in a CDMA mode. This allows a CDMA-based mobile device to keep the priority service request for an extended period of time in the queue, thereby increasing the probability of acquiring a radio channel. MSCs not operating in a CDMA mode do not have the ability to reset the timer; therefore, the rate of successful radio channel assignment for these networks is typically lower than CDMA-based networks. However, studies have shown that the successful radio channel assignment rate for networks that allow the queuing of requests is still much higher than that for networks that do not allow the requests to be queued.

Referring back to FIG. 1, after the radio channel is successfully assigned, the MSC 130 attempts to route the priority service call towards its destination. In one embodiment, the MSC 130 first determines the availability of a trunk that connects it to a network switching center that has a high probability of completing the call. For example, the network switching center may be a High Probability of Completion (HPC)-Capable Inter-exchange Carrier (IXC). If no trunk to any network switching center having a high probability of completing the call is available, the MSC 130 searches for any available trunk. After it finds one, the MSC removes the pending call from the MS 110 from the trunk queue and initiates call setup by sending an Initial Access Message (IAM) 152 to the destination through the public switched telephone network (PSTN) 170.

Figure 3:
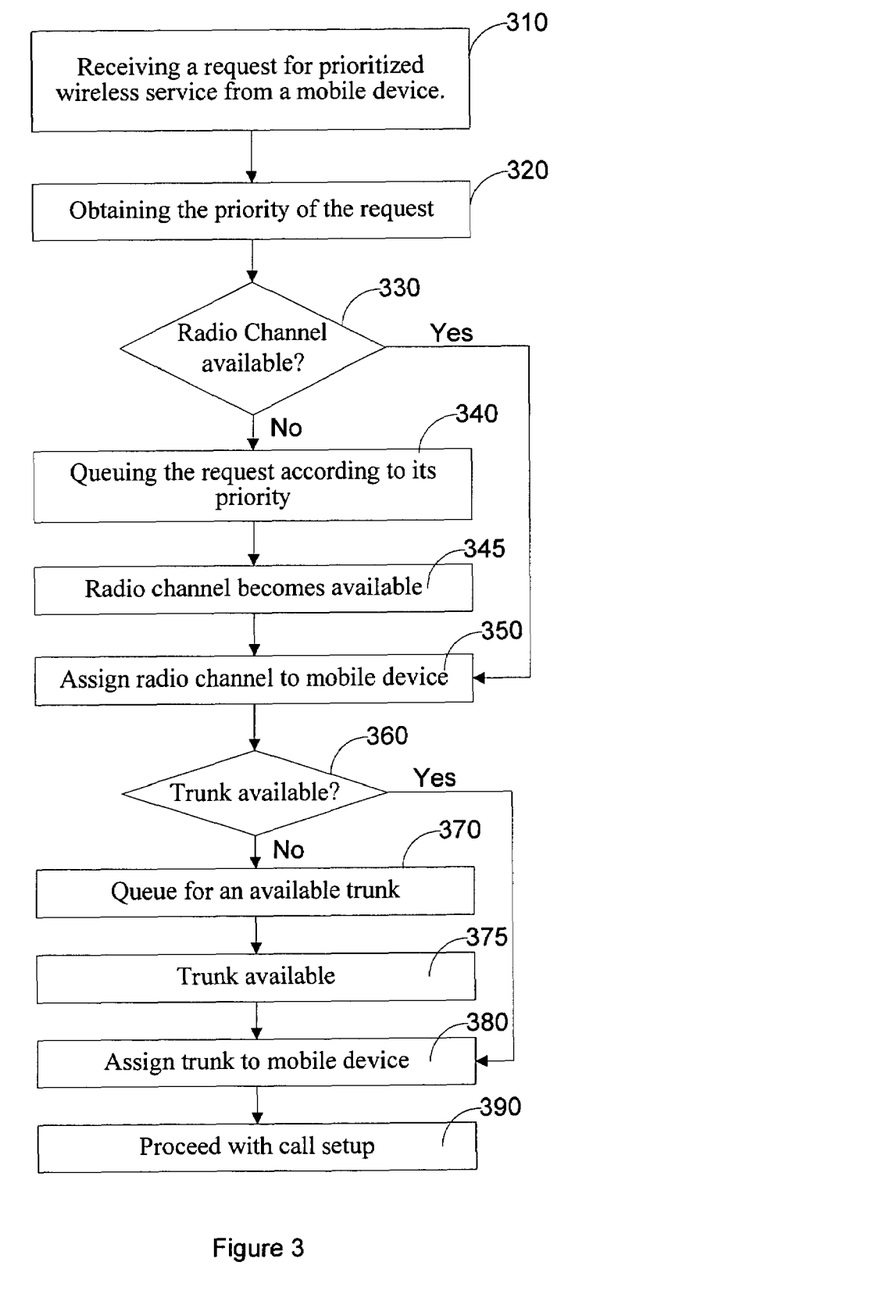
FIG. 3 is a flow chart of a method performed by a BS/MSC in one embodiment of the present invention.

FIG. 3 is a flow chart of a process performed by an MSC 130 in one embodiment of the present invention. In step 310, the MSC 130 receives a request, such as the Origination message 120, for prioritized wireless service from a mobile device that is not operating in a CDMA mode. In step 320, the priority of the request is obtained, possibly from a SCP. In step 330, the availability of a radio channel is determined. If no radio channel is available, step 340 queues the request according to its priority without resetting the timer associated with the mobile device. After a radio channel becomes available, the radio channel is assigned to the mobile device in step 350. In step 360, the availability of a trunk to a network switching center, such as a HPC-capable IXC, capable of a high probability of completion is determined. If no such trunk is available, in step 370 the prioritized wireless call from the mobile device is queued for any available trunk. If a trunk becomes available, it is assigned to the mobile device in step 380 and step 390 proceeds with call setup.

Figure 4:
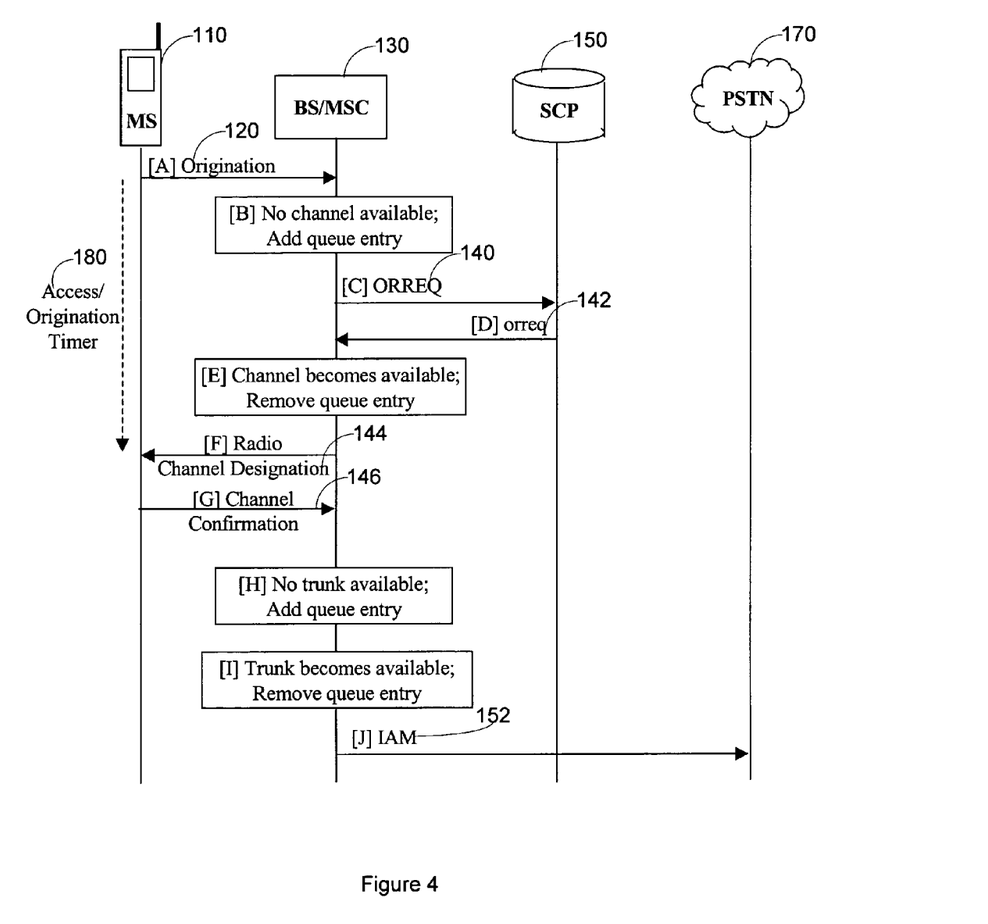
FIG. 4 schematically depicts the communications between a BS/MSC and other wireless network elements in another embodiment of the present invention.

The present invention further comprises a system that further improves the rate of successful radio channel assignment in prioritized wireless services. This system improves the success rate of radio channel assignment because the request is queued earlier, before a priority is obtained, thereby increasing the chance that it will be assigned to a radio channel before the timer expires. This system may be used in both CDMA and non-CDMA-based networks. FIG. 4 illustrates the communications between an MSC 130 and other wireless network elements in one embodiment of this system. In this embodiment, a mobile device (MS) 110 sends an Origination message 120 to the MSC 130 requesting prioritized wireless service and starts its timer. After receiving the Origination message 120, the MSC 130 determines if a radio channel is available before sending a query message to the SCP 150. If a radio channel is available, the MSC 130 assigns it to the MS 110 and queries the SCP 150 to validate the request. If the request is validated, the MSC 130 then proceeds to trunk queuing and call setup as described above. If no radio channel is available, the MSC 130 assigns a priority to the request and puts the request in a queue. In one embodiment, the assigned priority is a low priority, possibly the lowest priority, so that the request will not interfere with other validated request in the queue. Assigning a low priority to an initial request also protects the queue from being filled with potentially fraudulent prioritized service requests.

After queuing the request, the MSC 130 sends a query message 140 to an entity, such as the SCP 150, to validate the request and obtain its priority. If the request is validated, the MSC 130 obtains its priority from the validation message 142 and updates the request's position in the queue according to its priority. If the request is on top of the queue and a radio channel becomes available, the MSC 130 proceeds to radio channel assignment and trunk queuing as previously described.

Figure 5A:
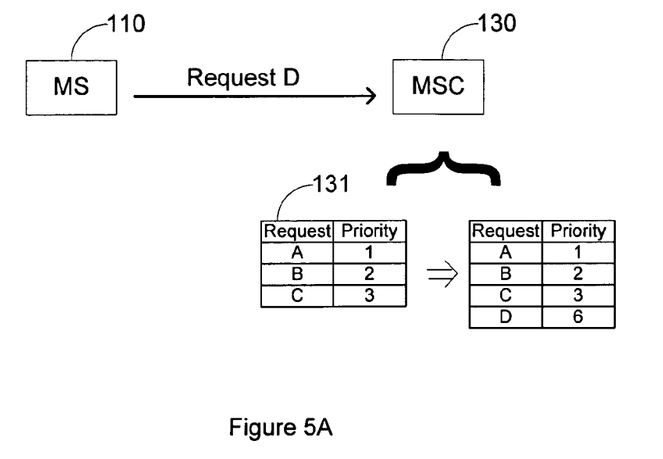
FIGS. 5A-5B illustrates the interactions between a mobile device, a BS/MSC, and a SCP in another embodiment of the present invention.
Figure 5B:
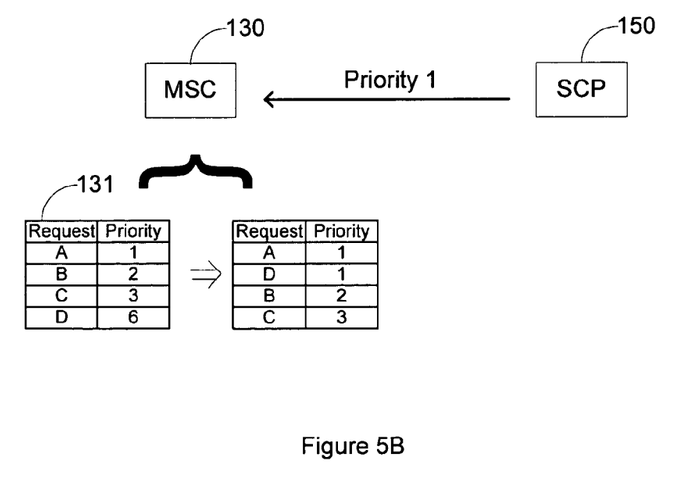

The interactions between the MS 110, the MSC 130 and the SCP 150 in this embodiment can be further illustrated using the example illustrated in FIG. 5. As shown in FIG. 5A, if the MSC 130 receives a request for prioritized services (request D) from the MS 110 and there are three requests (requests A, B and C with priority 1, 2 and 3, respectively) pending in the MSC's queue 131, then the MSC 130 will detect request D as a prioritized service request, assign a low priority (priority 6) to request D, and directly insert request D into its queue 131. At this point, request D is the last entry in the queue 131 due to its low priority. As shown in FIG. 5B, the MSC 130 queries the SCP 150 to validate request D and to return its priority (assuming the priority is 1). The MSC 130 then replaces request D's priority with the actual priority that was obtained from the SCP 150 and updates the position of request D in its queue 131 according to its actual priority and entry time. In this example, request D is moved from the last position in the queue 131 to the position right below request A since its actual priority is higher than the priorities of requests B and C, but its entry time is later than request A.

Figure 6:
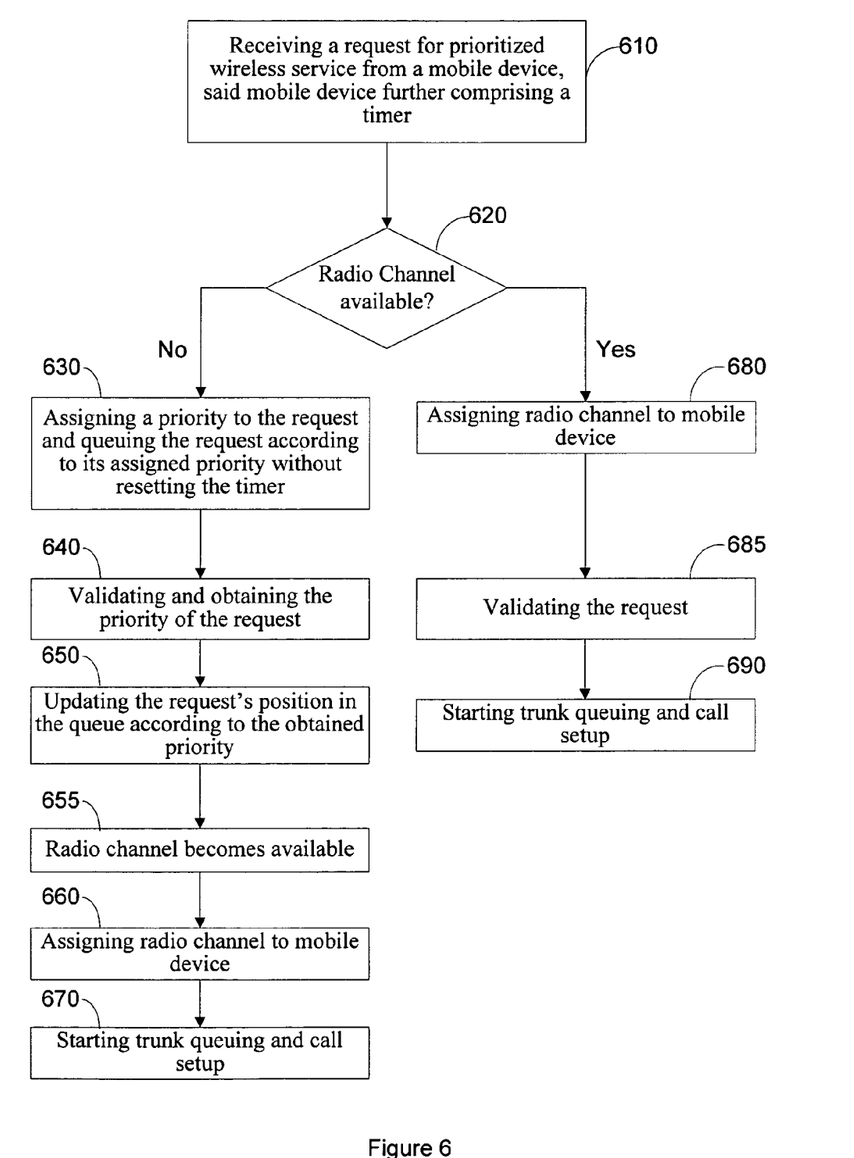
FIG. 6 is a flow chart of a method performed by a BS/MSC in yet another embodiment of the present invention.

FIG. 6 depicts a flow chart of a method executed by an MSC in one embodiment of the present invention that improves the successful rate of radio channel assignment. In step 610, a request is received for prioritized wireless service from a mobile device. In step 620, the availability of a radio channel is determined without sending the query message to obtain the priority of the request. If a radio channel is available, it is assigned to the mobile device in step 680. A query message to validate the request is sent in step 685. If the request is validated, trunk queuing and call setup starts in step 690 as described in steps 360-390 in FIG. 3. If no radio channel is available, a priority is assigned to the request and the request is queued according to the assigned priority without resetting the timer associated with the mobile device in step 630. The assigned priority is preferably a low priority as explained above. After queuing the request, the query message is sent in step 640 and the validation and priority of the request are obtained. The request's position in the queue is updated according to the obtained priority in step 650. When a radio channel becomes available, step 660 assigns the radio channel to the mobile device and step 670 starts trunk queuing and call setup as described in steps 360-390 in FIG. 3.

Figure 7:
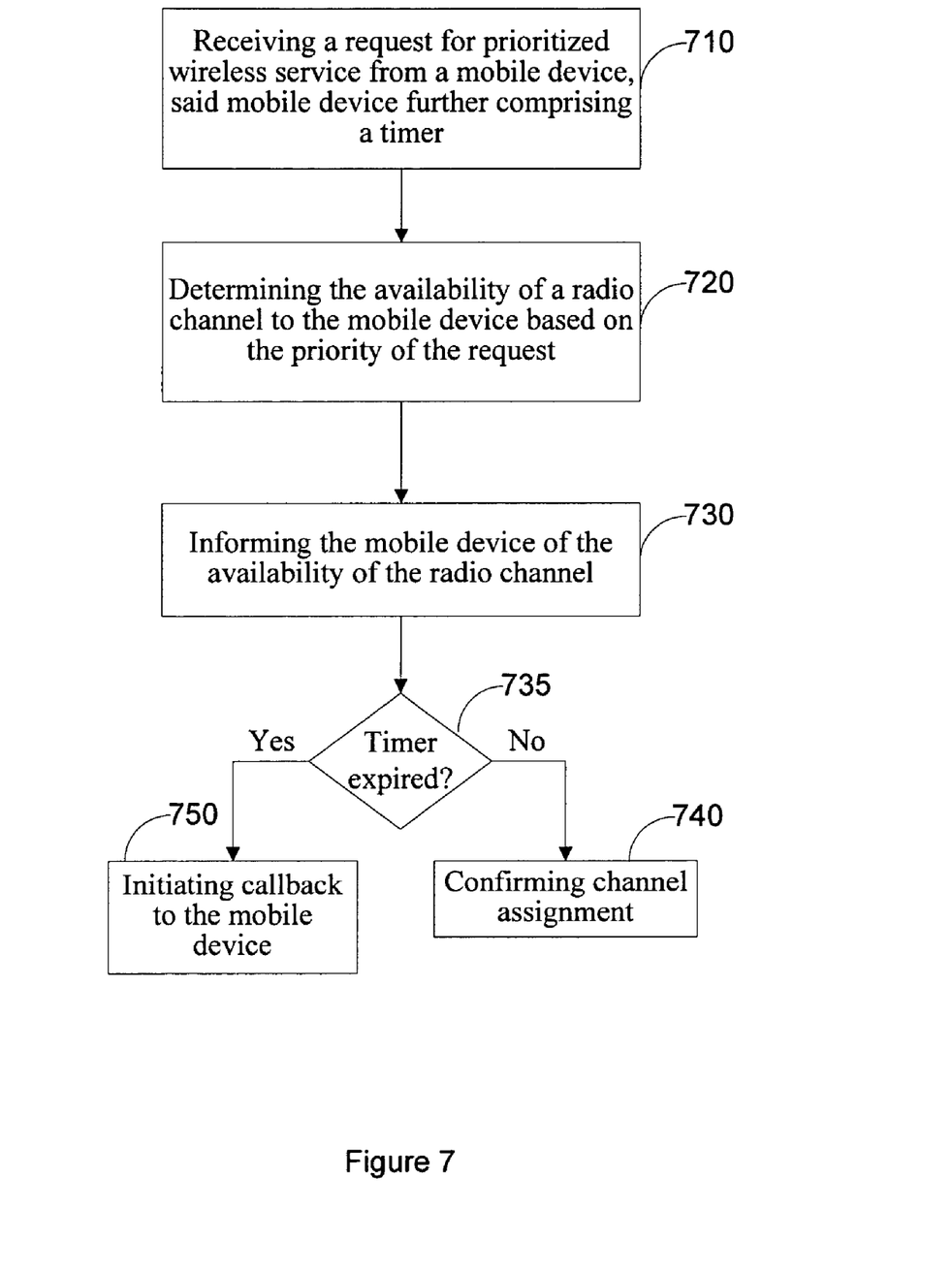
FIG. 7 is a flow chart of a callback method performed by a BS/MSC in yet another embodiment of the present invention.

In another embodiment of the present invention, a "callback" mechanism is provided to further improve the rate of successful radio channel assignment in prioritized wireless service. FIG. 7 is a flow chart of one embodiment of the callback method performed by an MSC. In step 710, the MSC receives a request for prioritized wireless service from a mobile device. The mobile device contains a timer and the timer is started after the request is sent. In step 720, the MSC determines the availability of a radio channel to the mobile device based on the priority of the request as described, for example, in steps 320-350 in FIG. 3, or steps 620-660 in FIG. 6. In step 730, the MSC informs the mobile device of the availability of the radio channel by, for example, sending a channel designation message 144 to the mobile device. In step 735, the mobile device receives the channel designation message. If its timer has not expired, the mobile device in step 740 proceeds to confirm the channel assignment by, for example, sending the confirmation message 146 back to the MSC. If the timer has expired, the mobile device will not respond to the channel designation message. In this case, the MSC in step 750 may initiate a callback to the mobile device by, for example, sending a page message to the mobile device. The mobile device may respond to the page message and the MSC then assigns the radio channel to the mobile device. The MSC may also sends an announcement message to inform the mobile device that the radio channel assigned is corresponding to the previously-dropped request. Optionally, before initiating the callback, the MSC may check whether a radio channel has already been assigned to the same mobile device in order to avoid redundant channel assignment.

Figure 8:
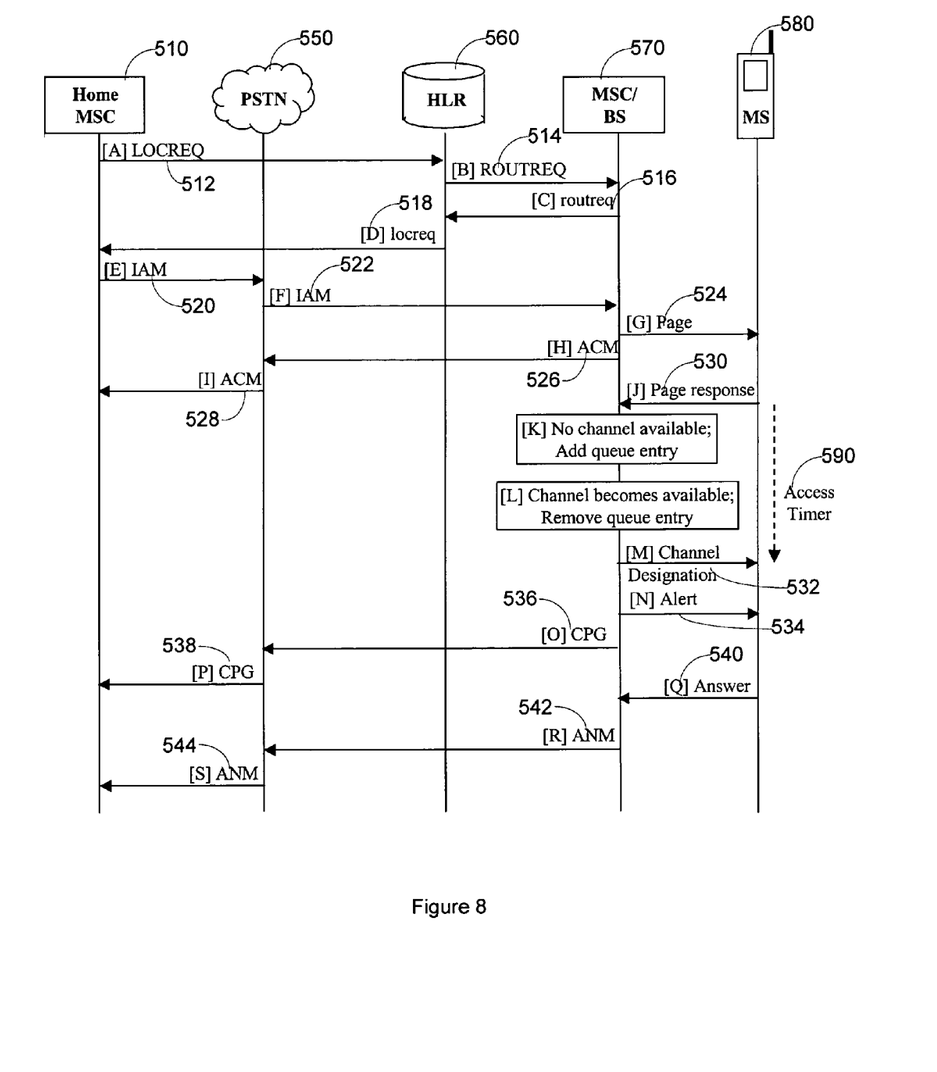
FIG. 8 schematically depicts the communications between a BS/MSC and other wireless network elements in yet another embodiment of the present invention.

The present invention further comprises a system for handling prioritized service messages that terminate at a mobile device not operating in a CDMA mode. FIG. 8 illustrates the communications between an MSC and other wireless network elements in one embodiment of this system. To illustrate this embodiment, an example is described in which a roaming MS 580 that is not operating in a CDMA mode is the destination of a prioritized service call. In this embodiment, a request for prioritized services to MS 580, possibly from another mobile device, is first received by the caller's Home MSC 510. The Home MSC 510 then validates the request and obtains the priority as described above. Next, the terminating MSC 570 serving the MS 580's current location is found and the call is delivered from the Home MSC 510 to the terminating MSC 570. This step can be accomplished via any of the well-known interactions between the caller's Home MSC 510, the caller's Home Location Register (HLR) 560 and the terminating MSC 570. In one embodiment, for example, the Home MSC 510 sends a location request message 512 to the HLR 560. The HLR 560 finds the location of the terminating MSC 570 and sends a route request message 514 to MSC 570 requesting routing information to the MS 580. The MSC 570 returns the routing information to the HLR 560 in a response message 516. The HLR 560 then forwards the location and routing information back to the Home MSC 510 in a response message 518. After locating the terminating MSC 570, the Home MSC 510 starts call set up by sending an IAM message 520 to a switching center in the PSTN 550. In one embodiment, the IAM message 520 includes the destination number and some special parameters for prioritized services identification.

After receiving the IAM message 520, the PSTN 550 forwards a corresponding IAM message 522 via appropriate routing to the terminating MSC 570. On receipt of the IAM message 522, the terminating MSC 570 determines the identity of the MS 580 and sends a Page message 524 to the MS 580. While waiting for the MS 580's response, the terminating MSC 570 may send an ISDN User Port (ISUP) address complete (ACM) message 526 to the PSTN 550 to indicate that the remote end of the trunk circuit has been reserved for this call. The PSTN 550 then forwards a corresponding ACM message 528 back to the Home MSC 510 indicating that a complete trunk route has been reserved for this call.

When it is available to answer the call, the MS 580 responds to the Page message 524 by sending a Page Response message 530 to the MSC 570 and starts its timer 590. After receiving the Page Response message 530, the MSC 570 determines the availability of a radio channel. If no radio channel is available, the MSC 570 puts the incoming call request from the Home MS 510 in a queue for an available radio channel according to its entry time and priority. If a radio channel becomes available, the MSC 570 removes the request from the queue and sends a channel designation message 532 to the MS 580. If the timer 590 has not expired, the MS 580 responds with an answer message 540 confirming the assignment of the radio channel. If, however, the timer 590 expires before message 532 reaches the MS 580, the MS 580 will drop the call without responding to the message 532. In this case, the MSC 570 may use the callback mechanism described in FIG. 7 to assign the radio channel to the MS 580. The MSC 570 may also send an alert message 534 to the MS 580 to prompt it to respond. Optionally, the terminating MSC 570 may also send an ISUP call progress (CPG) message 536 to the PSTN 550 while waiting for the MS 580 to respond to the alert message 534. The PSTN 550 then forwards a corresponding CPG message 538 to the Home MSC 510. The CPG message indicates that an event (such as an alert message has been sent) has occurred in the progress of a call. The MS 580's answer message 540 cancels the alert. After receiving the answer message 540, the MSC 570 sends an ISUP answer message (ANM) 542 to the PSTN 550 confirming the successful set up of radio link and the PSTN 550 forwards a corresponding ANM message 544 to the Home MSC 510. Detailed descriptions of ISUP messages IAM, ACM, ANM, and CPG can be found, for example, in the Signaling System No. 7 (C7) protocol developed by the International Telecommunication Union (ITU). The content of this protocol is hereby incorporated in its entirety as reference.

Figure 9:
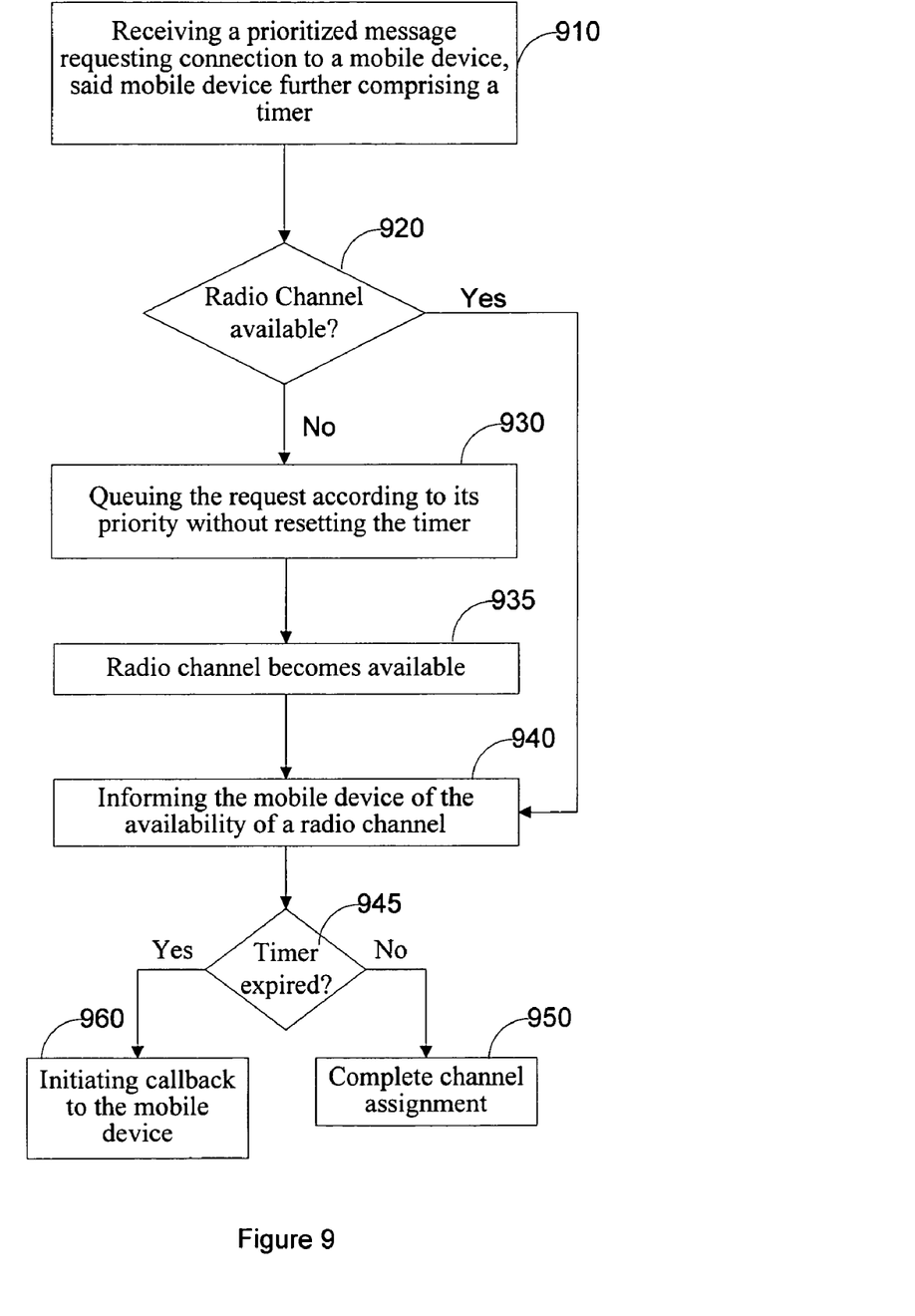
FIG. 9 is a flow chart of a method performed by a BS/MSC in yet another embodiment of the present invention.

FIG. 9 is a flow chart of a method performed by a terminating MSC in one embodiment of the present invention. In step 910, the MSC receives a prioritized message requesting connection to a mobile device. In step 920, the MSC determines the availability of a radio channel. If no radio channel is available, in step 930 the MSC queues the request according to its priority without resetting the timer associated with the mobile device. After a radio channel becomes available (step 935), steps 940-960 tries to assign the radio channel to the mobile device as described in steps 730-750 in FIG. 7.

Another embodiment of the present invention comprises an improved system for processing prioritized wireless messages. One embodiment of such a system comprises a Cellular Telecommunications System that is configured to execute one or more of the above-described methods. In one embodiment, the Cellular Telecommunications System is a Lucent AUTOPLEX® or Flexent® Cellular Telecommunications System that further comprises an MSC for performing call processing. The MSC further comprises memory for storing computer software program(s) that implement one or more of the above-described methods and microprocessors for executing the software programs. The configurations and operations of Lucent AUTOPLEX® and Flexent® Cellular Telecommunications Systems are well-known in the art.

While the above invention has been described with reference to certain preferred embodiments, the scope of the present invention is not limited to these embodiments. One skilled in the art may find variations of these embodiments which, nevertheless, fall within the spirit of the present invention, whose scope is defined by the claims set forth below.

What is claimed is:

1. A method of providing priority wireless service in a wireless telecommunications network, said method comprising:
   (a) receiving a request for priority wireless service from a mobile device;
   (b) assigning the mobile device a radio channel, if a radio channel is available for assignment to the mobile device at a time the request is received; and
   (c) if a radio channel is not available for assignment to the mobile device at the time the request is received, then:
      (i) assigning a temporary priority level to the request;
      (ii) placing the request in a queue at a location determined based upon the temporary priority level assigned to the request and the time the request was received;
      (iii) obtaining an actual priority level for the request after the request has been placed in the queue; and
      (iv) updating the location of the request in the queue based upon the actual priority of the request and the time the request was received.

2. The method of claim 1, wherein the temporary priority level is at or near a lowest priority level which is capable of being assigned to a request for priority wireless service.

3. The method of claim 1, said method further comprising:
   verifying if the mobile device is a valid user of the priority wireless service.

4. A method of providing prioritized wireless services, comprising the steps of:
   receiving a request for prioritized wireless service from a mobile device, said mobile device further comprising a timer;
   determining the availability of a radio channel to the mobile device based on the priority of the request;
   informing the mobile device of the availability of the radio channel; and
   initiating a callback to the mobile device if the mobile device's timer has expired.

5. A method of providing prioritized wireless services, comprising the steps of:

receiving a prioritized message requesting connection to a mobile device, said mobile device further comprising a timer;

determining the availability of a radio channel to the mobile device based on the priority of the request;

informing the mobile device of the availability of the radio channel; and initiating a callback to the mobile device if the mobile device's timer has expired.

6. The method of claim 1, wherein the mobile device is operating in an analog mode.

7. The method of claim 1, wherein the mobile device is operating in a TDMA mode.

* * * * *